United States Patent Office 3,130,037
Patented Apr. 21, 1964

3,130,037
METHOD OF SELECTIVELY CONTROLLING PLANT GROWTH
Otto Scherer, Karl Reichner, and Heinz Frensch, all of Frankfurt am Main, Germany, assignors to Farbwerke Hoechst Aktiengesellschaft vormals Meister Lucius & Brüning, Frankfurt am Main Hochst, Germany, a company of Germany
No Drawing. Filed Dec. 23, 1958, Ser. No. 782,413
Claims priority, application Germany Dec. 27, 1957
1 Claim. (Cl. 71—2.6)

It is known to use salts of nitrate phenols, particularly salts of dinitro-ortho-cresol or of dinitro-2-sec.-butyl-phenol as selective herbicides. A disadvantage of these products consists, on the one hand, in their relatively high toxicity to warm-blooded animals, and, on the other hand, in the yellow dyeing they cause on the plants and, above all, on the appliers. Moreover, their application is restricted to a few culture plants only since their selective properties are rather limited. As it is known, the salts of nitrated phenols and naphthols, for example, can be used as herbicides only in the protection of cereals, those of the nitrated alkylphenols, for instance of dinitro-2-sec.-butyl-phenol, likewise in the protection of peas-, flax-, onion-cultures and possibly in lucerne-cultures. More or less intense damages of these cultures must, however, be suffered when applying these substances as herbicides.

Now, we have found that these drawbacks can be avoided by using, preferably when selectively combatting weeds, compounds of the formula

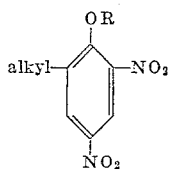

in which R represents the radical of an unsubstituted fatty acid or of a halogen-substituted fatty acid containing from 1 to 8 carbon atoms, of nicotinic acid or of carbonic acid ethyl ester and alkyl is an alkyl radical containing from 1 to 4 carbon atoms.

In solid formulations the preparations to be applied contain 20–50% of active substance, 10–30% of colloidal protecting and dispersing agents, for instance lignin-sulfonic acid sodium, casein or methyl-cellulose, 0.1–3% of a wetting agent, for instance sodium dodecyl-phenyl, polyoxethylated alkyl phenols or oleic acid methyl-tauride, for the rest it contains an inert material, for example talcum or kaolin, whereas the liquid formulation contains, for instance, 5–50% of active substance, 1–5% of a non-ionogenic wetting agent, such as oxethylated alkyl-phenol, oxethylated carboxylic acid or an alcohol or ester, or a mixture of ionogenic and non-ionogenic wetting agents, for instance, the calcium salt of dodecyl-phenyl-sulfonic acid and the afore-mentioned non-ionogenic types, for the rest, e.g. methanol or another solvent.

When applying the esters according to the invention, for instance the acetyl-compound of 4,6-dinitro-2-sec.-butyl-phenol, no dyeings occurred on the plants treated nor were the persons who applied the preparations molested by yellow staining. The same can be observed when chloracetate of dinitro-ortho-cresol is used.

It surprisingly resulted from the tests that the compounds claimed in addition to a safe herbicidal effect likewise exhibited a greater selectivity with a view to the culture-plants than comparison products, irrespective of their being applied in the pre-emergent process or in the post-emergent process. On the strength of their considerable selective properties the compounds claimed can be applied more safely and in a broader scope, which extends, above all, to broad beans *Vicia faba*, bush-beans, soy-beans, vetches and mixtures of leguminosae with cereals or maize (corn).

The products are prepared in the following manner:

Carboxylic acid halides or carboxylic acid anhydrides are caused to act in an anhydrous medium and in a manner which is already known, on dinitro-alkyl-phenols.

For example, carboxylic acid halides are caused to react with dinitro-alkyl-phenols in the presence of tertiary amines as catchers for halogen halide, or carboxylic acid anhydrides are boiled with dinitro-alkyl-phenols and catalytic amounts of tertiary amines, or the anhydrous alkali metal salts or alkaline earth metal salts of dinitrophenols, carboxylic acid halides or carboxylic acid anhydrides are caused to react with each other.

In this manner the esters of dinitro-sec.-butyl-phenol and acetic acid, propionic acid, butyric acid, valeric acid, caproic acid, acrylic acid, nicotinic acid, carbonic acid are obtained.

Except the latter, these esters are syrupy yellow-brown oils which can be distilled in most cases only with decomposition. They are insoluble in water and well soluble in most of the organic solvents.

Apart from the first-mentioned acetic acid ester, the esters are new substances. Other dinitro-alkyl-phenol-esters are prepared in a corresponding manner.

The following examples deal with the preparation and the favorable use of the compounds claimed.

Toxicological tests showed that in each group of 20 female rats the lethal dose 50 of dinitro-sec.-butyl-phenol amounted to 30 milligrams per kilogram of rat, orally administered, whereas the acetyl compound showed an $LD_{50}$ of about 60 milligrams/kilogram of rat, orally administered, i.e. the acetyl compound is only half as toxic as the free phenol.

The following examples serve to illustrate the invention but they are not intended to limit it thereto, the parts being by weight.

EXAMPLE 1

*Preparation of the Propionate of Dinitro-Sec.-Butyl-Phenol*

120 parts of dinitro-sec.-Butyl-phenol, 100 parts of propionic acid anhydride and 1 part of pyridine are heated for 5 hours at 140–150° C., and the propionic acid which has been formed as well as the non-reacted anhydride are distilled off at a maximum temperature of 150° C. A yellow-brown oil remains in a yield of 95.3% of the theory.

N calculated—9.48%
N found—9.45%

EXAMPLE 2

In the same manner as described in Example 1 the acetate from dinitro-sec.-butyl-phenol and acetic acid anhydride can be prepared. There are obtained more than 95% of the theoretical yield of a yellow-brown oil exhibiting very good nitrogen-values.

EXAMPLE 3

*Preparation of the Nicotinic Acid Ester of Dinitro-Sec.-Butyl-Phenol*

51.5 parts of nicotinic acid are introduced at 0–10° C. into 130 parts of thionyl-chloride and heated within 3 hours to 75° C. At first dissolution sets in, then the reaction mass crystallizes out. The main part of the non-reacted thionyl-chloride is distilled off under reduced pressure. A cocoa-brown powder is obtained which is completely liberated from thionyl-chloride by passing nitrogen over it. 120 parts of crystalline dinitro-sec.-butyl-phenol are added and the whole is mixed with 80 parts of pyridine. The dark mass is heated for 30 minutes on the boiling water-bath. At first it becomes very thin, but later on it becomes thick again. It is diluted in a separating vessel with 1300 parts of benzene or ether and 1000 parts of water and then all non-reacted parts are washed out by means of hydrochloric acid and subsequently in a soda-alkaline medium. At last it is washed out with water. The solution is clarified and after drying, the organic solvent is distilled off under reduced pressure. The desired ester is thus obtained in a yield of about 60% of the theory in the form of a yellow-brown sirup.

N calculated—12%
N found—11.95%

EXAMPLE 4

In a similar manner as described in Example 3 there are obtained, for example, the esters of n-valeric acid and of n-caproic acid, by mixing 1 mol of the acid chloride with 1 mol of dinitro-sec.-butyl-phenol and adding in several portions 1½ to 2 mols of a tertiary amine, for instance dimethyl-aniline or diethyl-aniline or pyridine or dimethyl-benzylamine and the like, the temperature being allowed to reach 70–80° C.

This temperature is maintained for 1–2 hours, inert organic solvents are added to the mass, for instance, benzene, toluene, methylene-chloride, carbon tetrachloride and the like (proportions: 1 mol of the acid chloride:2–3 liters of liquid), and water and the mass is first shaken with dilute hydrochloric acid, then with dilute soda solution and, finally, all undissolved parts are washed out with water. The organic solutions are clarified, dried and the solvent is distilled off under reduced pressure at a maximum temperature of 100° C. There are, for instance, obtained according to the above method 91% of n-valeric acid ester: N calculated—8.63%; N found—8.5%
93% of the n-caproic acid ester: N calculated—8.28%; N found—8.3%

The n-butyric acid ester and the acrylic acid ester can likewise be obtained in this manner with good yields and in a high purity.

EXAMPLE 5

For preparing the mixed dinitro-sec.-butyl-phenol-ethylcarbonic acid ester one mol of for instance the sodium salt of dinitro-sec.-butyl-phenol which can easily be obtained from aqueous-alkaline solution by salting out with sodium chloride, is completely dehydrated by azeotropic distillation in benzenic suspension. 1 mol of formic acid ethyl-ester is added dropwise and the mixture is heated to boil until the whole amount of sodium salt has been reacted. Water is added to the cooled reaction mixture and the benzenic solution of the desired substance is liberated from all by-products at first in a soda-alkaline medium and then in a weakly acid medium. It is then dried and the benzene is distilled off under reduced pressure. The desired substance is obtained in a yield of more than 90% of the theory. Melting point: 36–38° C.

EXAMPLE 6

When treating a field of oat all over grown with charlock (*Sinapis arvensis*) with a spraying powder containing in addition to 30 parts of acetyl-4,6-dinitro-2-sec.-butyl-phenol as active substance 30.0 parts of sulfite waste liquor (lignin-sulfonic acid sodium), 39.5 parts of kaolin and 0.5 part of sodium dodecyl-phenyl sulfonate as carrier-, colloidal- or wetting-agent at a rate of 4.0 kilograms per hectare and 800 liters of water, the charlock is killed whereas the oat remains unaffected to a large extent.

EXAMPLE 7

When applying 2.5 kilograms per hectare of acetyl-4,6-dinitro-2-sec.-butyl-phenol in 800 liters of water by the pre-emergence-process in a formulation containing in addition to 30 parts of active substance 30 parts of sulfite waste liquor (lignin-sulfonic acid sodium), 39.5 parts of kaolin and 0.53 part of sodium dodecyl-phenyl-sulfonate as carrier-, wetting- and dispersing-agent, the following results are obtained:

Charlock: About 50% did not come up, the rest suffered distinct to severe injury.
Oat: Practically normal.

Corresponding known dinitro-2-sec.-butyl-phenol formulations soluble in water show a reduced activity on charlock whereas the oat is more injured.

EXAMPLE 8

In a further green house test a product containing 30% of acetyl-4,6-dinitro-2-sec.-butyl-phenol was compared after coming up of oat and charlock by means of the spraying process with a preparation of 4,6-dinitro-2-sec.-butyl-phenol corresponding to that described in Example 7 and applied in various concentrations. A more strongly selective herbicidal activity of the acetyl-4,6-dinitro-2-sec.-butyl-phenol was ascertained.

EXAMPLE 9

When applying 0.5 gram/sq. m. of dinitro-ortho-cresol-chloracetate in a series of experiments carried out in cardboard boxes of a content of 250 cc. in green houses before charlock and oat had come up, the charlock was completely killed, whereas the oat was not at all injured, even when 4 grams/sq. m. of the above substance were applied.

A comparable dinitro-2-sec.-butyl-phenol preparation, while exhibiting about the same activity, had the disagreeable property of imparting a yellow tint.

EXAMPLE 10

In a series of experiments several types of compounds claimed were tested in comparison with the known ammonium salt of dinitro-2-sec.-butyl-phenol on charlock and oat. All preparations were applied as emulsion concentrates of the same content of active substance in the following composition:

5% of active substance,
94.0% of solvent (methanol),
1% of emulsifier (tert. tributylphenol),
condensed with 10 mols of ethylene-oxide.

The ammonium salt of dinitro-2-sec.-butyl-phenol as comparable substance was applied in the same formulation.

The compounds were applied in the post-emergence-process (Table I) with 800 liters of water per hectare, in the preemergence-process with 1000 liters of water (Table II). When applying the post-emergence-process the plants were treated at a height of about 15 centimeters, in the pre-emergence process one day after the seed had been effected. The activity was judged according to the evaluation key 0–5 generally applied, wherein 0 means "completely unaffected," 5 means "totally killed (dead)."

The following Tables I and II show the results of the comparison tests carried out with the various types of compounds and obtained with different quantities. Table I shows the results obtained in the post-emergence tests, Table II those of the pre-emergence tests.

EXAMPLE 11

Peas of the type "Kleine Rheinländerin," beans (*Vicia faba*) and vetches (*Vicia sativa*) which were considerably grown all over with charlock (*Sinapis arvensis*), Chenopodium spec., Polygonum spec., and *Galinsoga parviflora* were treated at a height of about 22 centimeters at a rate of 4.0 kilograms/hectare and 800 liters of water with a spraying powder containing in addition to 30.0 parts of acetyl-4,6-dinitro-2-sec.-butyl-phenol as active substance 30.0 parts of sulfite waste liquor (lignin-sulfonic acid sodium), 39.5 parts of kaolin and 0.5 part of sodium dodecyl-phenyl-sulfonate as carrier-, colloidal- and wetting-agent. As comparison substance there was applied a commercial dinitro-2-sec.-butyl-phenol-preparation containing 30.0 parts of active substance and 70 parts of inert carrier or solvent (methanol), furthermore, a commercial dinitro-ortho-cresol-preparation containing 50.0 parts of active substance and 50.0 parts of carrier-, colloidal protecting- and wetting-agent. Both comparison substances were applied in the same manner as the test preparation at a rate of 4.0 kilograms/hectare and 800 liters of water.

The activity on culture fruit (peas, beans, vetches) was judged 14 days after the treatment according to the usual evaluation key 0–5, 0 meaning "unaffected," 5 meaning "totally killed."

As results from Table III, acetyl-4,6-dinitro-2-sec.-butyl-phenol in addition to a moderately improved activity on weeds shows a considerably increased selectivity in comparison with both test substances.

EXAMPLE 12

Bush beans (Phaseolus) of the type "Saxa o F" considerably grown all over with *Galinsoga paryiflora*, charlock, Polygonum spec. and *Senecio vulgaris* were treated:

(a) Immediately after the bean seed has pierced through the soil (b) In the stage of the primary leaf, (c) On full development of the first normal pinnate leaf by means of a spraying composition of 3.0 kilograms/hectare and 800 liters of water and containing in addition to 30 parts of acetyl-4.6-dinitro-2-sec.-butyl-phenol as active substance 30 parts of sulfite waste liquor (lignin-sulfonic acid sodium), 39.5 parts of kaolin and 0.5 part of sodium dodecyl-phenyl-sulfonate as carrier-, colloidal protecting- and wetting-agent.

As comparison substance commercial ammonium salt of dinitro-2-sec.-butyl-phenol was used with 30 parts of active substance and 70 parts of solvent (methanol) and a commercial triethanol-amine salt of dinitro-2-sec.-butyl-phenol of the same formulation.

TABLE I.—POST-EMERGENCE TESTS

| Type of compound | Degree of injury of charlock and oat 14 days after treatment | | | | | |
|---|---|---|---|---|---|---|
| | Active substance, kg./hectare | Charlock | Oat | Active substance, kg./hectare | Charlock | Oat |
| Nicotinic acid ester of dinitro-2-sec-butyl-phenol | 0.5 | 5 | 1.0 | 1.0 | 5 | 2 |
| Propionic acid ester of dinitro-2-sec-butyl-phenol | 0.5 | 5 | 2.0 | 1.0 | 5 | 2 |
| n-Butyric acid ester of dinitro-2-sec-butyl-phenol | 0.5 | 5 | 2.0 | 1.0 | 5 | 2.8 |
| n-Valeric acid ester of dinitro-2-sec-butyl-phenol | 0.5 | 5 | 2.0 | 1.0 | 5 | 3.0 |
| n-Caproic acid ester of dinitro-2-sec-butyl-phenol | 0.5 | 5 | 2.0 | 1.0 | 5 | 3.0 |
| Acrylic acid ester of dinitro-2-sec-butyl-phenol | 0.5 | 5 | 2.0 | 1.0 | 5 | 3.0 |
| Carbonic acid ethyl-ester of dinitro-2-sec-butyl-phenol | 0.5 | 5 | 1.0 | 1.0 | 5 | 2.0 |
| Acetic acid ester of dinitro-2-sec-butyl-phenol | 0.5 | 5 | 1.0 | 1.0 | 5 | 1.5 |
| Comparison agent-ammonium salt of dinitro-2-sec.-butyl-phenol | 0.5 | 4.3 | 2.3 | 1.0 | 5 | 2.8 |
| Control—untreated | | 0 | 0 | | 0 | 0 |

TABLE II.—PRE-EMERGENCE TESTS

| Type of Compound | Degree of injury of culture plants (oat) and weed 14 days after treatment | | | | | |
|---|---|---|---|---|---|---|
| | Active substance, kg./ha. | Charlock | Oat | Active substance, kg./ha. | Charlock | Oat |
| Nicotinic acid ester of dinitro-2-sec. butyl phenol | 2.5 | 3.0 | 1.0 | 5.0 | 5.0 | 2.0 |
| Propionic acid ester of dinitro-2-sec. butyl phenol | 2.5 | 3.8 | 0.8 | 5.0 | 5.0 | 1.0 |
| n-Butyric acid ester of dinitro-2-sec. butyl phenol | 2.5 | 4.0 | 1.0 | 5.0 | 4.5 | 1.5 |
| n-Valeric acid ester of dinitro-2-sec. butyl phenol | 2.5 | 4.5 | 1.0 | 5.0 | 5.0 | 1.5 |
| n-Caproic acid ester of dinitro-2-sec- butyl phenol | 2.5 | 4.5 | 1.0 | 5.0 | 5.0 | 2.0 |
| Acrylic acid ester of dinitro-2-sec. butyl phenol | 2.5 | 5.0 | 1.0 | 5.0 | 5.0 | 1.5 |
| Carbonic acid ethyl-ester of dinitro-2-sec. butyl phenol | 2.5 | 4.8 | 1.5 | 5.0 | 5.0 | 1.0 |
| Acetic acid ester of dinitro-2-sec. butyl phenol | 2.5 | 5.0 | 1.0 | 5.0 | 5.0 | 1.5 |
| Comparison agent—ammonium salt of dinitro-2-sec. butyl phenol | 2.5 | 3.5 | 1.0 | 5.0 | 4.5 | 2.0 |
| Control—untreated | | 0 | 0 | | 0 | 0 |

TABLE III

| Type of Compound | Active substance, kilogram/hectare | Activity on culture fruit and weed 14 days after treatment—evaluation key 0–5 | | | | | | |
|---|---|---|---|---|---|---|---|---|
| | | Culture fruits | | | Weeds | | | |
| | | Beans | Peas | Vetches | Charlock | Chenopodium spec. | Polygonum spec. | *Galinsoga parviflora* |
| Acetyl-4-6-dinitro-2-sec.-butylphenol | 1.2 | 0.5 | 0.2 | 1.0 | 5.0 | 5.0 | 4.8 | 5.0 |
| Ammonium salt of dinitro-2-sec. butyl-phenol | 1.2 | 2.0 | 10. | 3.0 | 5.0 | 4.2 | 3.5 | 4.8 |
| Ammonium salt of dinitro-orthocresol | 2.0 | 4.8 | 3.2 | 4.5 | 5.0 | 4.0 | 2.8 | 4.0 |
| Untreated | | 0 | 0 | 0 | 0 | 0 | 0 | 0 |

The comparison substances were applied on the same day and under the same conditions. The test was repeated 4 times at a size of soil treated of 5 sq.m.

The activity on the culture fruit and the weed was judged by evidence 10 days after the treatment according to the usual evaluation key 0–5, wherein 0 means unaffected and 5 means totally killed.

As results from Tables IV, V and VI, only acetyl-4.6-dinitro-2-sec.-butyl-phenol can be used with good safety of application and with good activity as herbicide in bushbean cultures. The ammonium salt and the triethanolamine salt of dinitro-2-sec.-butyl-phenol injure the culture fruits so considerably that they cannot be used as herbicides for bush-beans.

We claim:
The method of selectively controlling plant growth which comprises applying to plants a compound of the formula

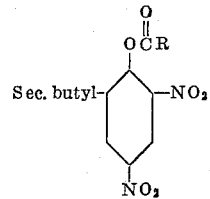

wherein R is a member selected from the group consisting of alkyl and alkenyl radicals having one to three carbon atoms, whereby the growth of undesirable weed plants is adversely affected.

TABLE IV.—APPLICATION ON PIERCING OF BEAN SEEDS THROUGH SOIL

| Preparation | Active substance, kilogram/hectare | Activity on culture fruit and weed 10 days after treatment—evaluation key 0–5 | | | | |
|---|---|---|---|---|---|---|
| | | Bush beans | Charlock | Polygonum spec. | Senecio vulgaris | Galinsoga parviflora |
| Acetyl-dinitro-2-sec. butylphenol | 0.9 | 0 | 3.8 | 3.2 | 4.2 | 5.0 |
| Ammonium salt of dinitro-2-sec. butyl-phenol | 0.9 | 2 | 3.0 | 2.8 | 3.5 | 4.2 |
| Triethanol-amine-salt of dinitro-2-sec. butyl-phenol | 0.9 | 1.5 | 3.2 | 3.0 | 3.2 | 4.0 |
| Untreated | | 0 | 0 | 0 | 0 | 0 |

TABLE V.—APPLICATION IN THE PRIMARY LEAF STAGE OF BUSHBEANS

| Preparation | Active substance, kilogram/hectare | Activity on culture fruit and weed 10 days after treatment—evaluation key 0–5 | | | | |
|---|---|---|---|---|---|---|
| | | Bush beans | Charlock | Polygonum spec. | Senecio vulgaris | Galinsoga parviflora |
| Acetyl-dinitro-2-sec. butylphenol | 0.9 | 0.8 | 5.0 | 4.8 | 5.0 | 5.0 |
| Ammonium salt of dinitro-2-sec. butyl-phenol | 0.9 | 2.8 | 4.5 | 4.2 | 5.0 | 4.8 |
| Triethanol-amine-salt of dinitro-2-sec. butyl-phenol | 0.9 | 2.5 | 4.2 | 4.0 | 5.0 | 5.0 |
| Untreated | | 0 | 0 | 0 | 0 | 0 |

TABLE VI.—APPLICATION: NORMAL PRIMATE LEAF OF BUSH-BEAN COMPLETELY DEVELOPED

| Preparation | Active substance, kilogram/hectare | Activity on culture fruit and weed 10 days after treatment—evaluation key 0–5 | | | | |
|---|---|---|---|---|---|---|
| | | Bush beans | Charlock | Polygonum spec. | Senecio vulgaris | Galinsoga parviflora |
| Acetyl-dinitro-2-sec. butyl-phenol | 0.9 | 2.2 | 4.5 | 4.0 | 4.3 | 4.8 |
| Ammonium salt of dinitro-2-sec. butyl-phenol | 0.9 | 4.0 | 4.8 | 4.0 | 4.1 | 4.5 |
| Triethanol-amine of dinitro-2-sec. butyl-phenol | 0.9 | 3.8 | 4.0 | 3.8 | 4.0 | 4.6 |
| Untreated | | 0 | 0 | 0 | 0 | 0 |

References Cited in the file of this patent

UNITED STATES PATENTS

| | | |
|---|---|---|
| 2,048,168 | Pollard | July 21, 1936 |
| 2,127,090 | Smith | Aug. 16, 1938 |
| 2,384,306 | Hester et al. | Sept. 4, 1945 |
| 2,577,969 | Jones | Dec. 11, 1951 |
| 2,807,639 | Rickert | Sept. 24, 1957 |
| 2,873,293 | Kundiger et al. | Feb. 10, 1959 |
| 2,880,231 | Freedman et al. | Mar. 31, 1959 |
| 2,935,392 | Mussell | May 3, 1960 |
| 2,937,935 | Howard et al. | May 24, 1960 |

FOREIGN PATENTS

| | | |
|---|---|---|
| 830,431 | Germany | Feb. 4, 1952 |

OTHER REFERENCES

McClellan et al., Chem. Abstracts, vol. 44, col. 9101 (1950).

Kirby et al., Chem. Abstracts, vol. 48, col. 5425 (1954).

Trussell et al., Chem. Abstracts, vol. 50, col. 6738 (1956).